May 24, 1932. S. T. HOWARD 1,860,032
ARTICLE SUPPORT
Filed June 2, 1931
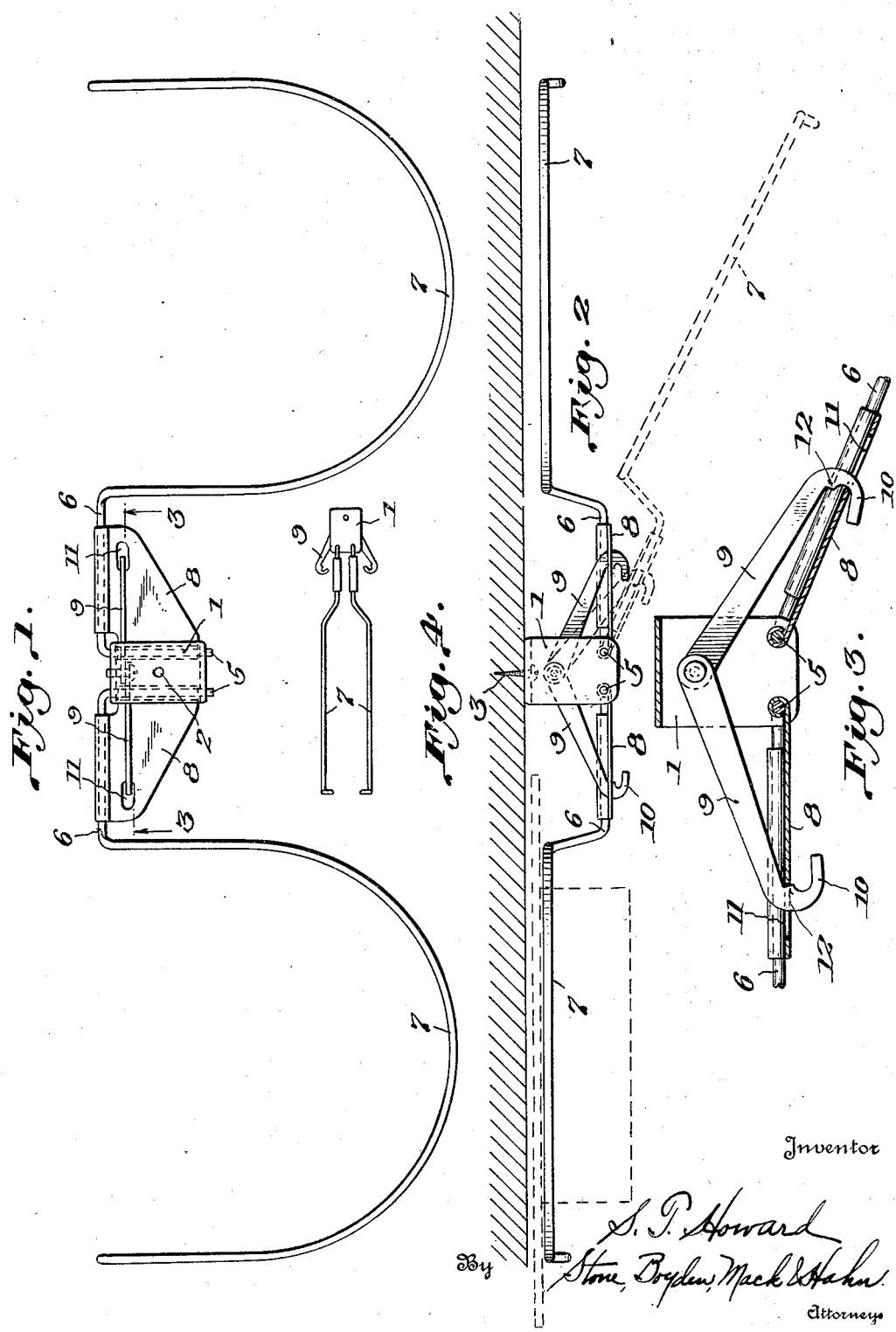
Inventor
S. T. Howard
By Stone, Boyden, Mack & Hahn
Attorneys Patented May 24, 1932

1,860,032

UNITED STATES PATENT OFFICE

STYLES T. HOWARD, OF JEFFERSONVILLE, INDIANA

ARTICLE SUPPORT

Application filed June 2, 1931. Serial No. 541,677.

This invention relates to article supports and has particular reference to a device for holding hats or other articles in an automobile.

The primary object of the present invention is to provide a hat holder for automobiles which may be easily and quickly operated with one hand thus permitting the driver to use the device while the car is in motion.

Another object is to provide a device of this character which shall consist of few parts that are simple in construction and inexpensive to manufacture and assemble.

A further object is to provide a hat holder which may be compactly folded for shipment and which may be easily and quickly installed by inexperienced persons.

With the foregoing and other objects in view, the invention may be stated to consist in the various novel features of construction and arrangement or combination, all of which will be fully described hereinafter and pointed out in the appended claims.

In the drawings accompanying and forming part of this application:

Fig. 1 is a plan view of a holder constructed in accordance with my invention;

Fig. 2 is a side elevation showing the same installed and in use;

Fig. 3 is an enlarged detailed sectional view taken on the line 3—3 of Fig. 1; and Fig. 4 is a side elevation of the device folded for packing and shipping.

A hat support constructed in accordance with my invention comprises an inverted U-shaped base member 1 which is preferably provided with an aperture 2 to receive a screw 3, or other fastening element, to secure the device to an automobile roof or other suitable support.

A pair of article supporting arms extend laterally from each side of the base member. Each of these arms is preferably formed of heavy gauge wire which is provided with a longitudinal portion 5 that is journalled between the sides of the base member 1, and a lateral portion 6 which terminates in an open-sided U-shaped article support 7. Interconnecting the portions 5 and 6 is a substantially triangular shaped sheet metal plate 8 which is conveniently fastened in place by rolling the adjacent edges thereof over the portions 5 and 6.

Pivoted to one side of base member 1 are a pair of oppositely extending arms 9, each of which terminates in a hook portion 10 that projects through an elongated aperture 11 in its respective plate 8. As clearly shown in Fig. 3 the hooked end portion of each arm is formed with a shoulder 12 which is adapted to engage the edge of aperture 11 to maintain the arm in a substantially horizontal and article supporting position.

In use, an arm is lowered to receive a hat or other article by pushing upwardly on the hooked end portion 10. This releases the shoulder 12 from engagement with the edge of aperture 11 and permits the arm to drop to the position shown in dotted lines in Fig. 2. The hat or other article is then positioned in the U-shaped portion of the arm and the arm is pushed upwardly until shoulder 12 again engages the edge of aperture 11, thereby maintaining the hat securely against the car roof as shown in Fig. 2. It will be obvious that the above operations may be easily and quickly performed with one hand and hence the driver may operate the device while driving without relinquishing control of the steering wheel.

By referring to Fig. 4, it will be evident that the two arms may be folded to parallel positions by disengaging the hooked ends 10 from apertures 11, thereby forming a compact device which may be easily shipped.

What I claim is:

1. An article support of the character described comprising a base member having depending sides, an article supporting arm formed from a single piece of wire having one end portion thereof pivoted between said depending sides and the opposite end portion extending at substantially right angles thereto and defining a U-shaped support, a plate interconnecting said right angled portions and formed with an aperture therein, and a latch pivotally connected to said base member and extending through said aperture.

2. An article support of the character described comprising a base member having depending sides, an article supporting arm formed from a single piece of wire having one end portion thereof pivoted between said depending sides and the opposite end portion extending at substantially right angles thereto and defining a U-shaped support, a plate interconnecting said right angled portions and formed with an aperture therein, and a latch pivotally connected to said base member and extending through said aperture, said latch having a shoulder adapted to engage an edge of the plate defining said aperture to hold said arm in article maintaining position and a hooked portion to hold said arm in article releasing position.

In testimony whereof I affix my signature.

STYLES T. HOWARD.